(12) United States Patent
Lee et al.

(10) Patent No.: US 10,862,082 B2
(45) Date of Patent: *Dec. 8, 2020

(54) BATTERY MODULE ASSEMBLY

(71) Applicant: LG CHEM, LTD., Seoul (KR)

(72) Inventors: Bum Hyun Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 177 days.

This patent is subject to a terminal disclaimer.

(21) Appl. No.: 16/043,676

(22) Filed: Jul. 24, 2018

(65) Prior Publication Data

US 2018/0331334 A1  Nov. 15, 2018

Related U.S. Application Data (63) Continuation of application No. 14/779,514, filed as application No. PCT/KR2014/006918 on Jul. 29, 2014, now Pat. No. 10,062,877.

(30) Foreign Application Priority Data

Jul. 31, 2013 (KR) ........................ 10-2013-0090849

(51) Int. Cl.
  *H01M 2/10* (2006.01)
  *H01M 2/20* (2006.01)
  (Continued)

(52) U.S. Cl.
  CPC ....... *H01M 2/1016* (2013.01); *H01M 2/1022* (2013.01); *H01M 2/1072* (2013.01);
  (Continued)

(58) Field of Classification Search
  CPC ........................... H01M 2/0245; H01M 2/202
  See application file for complete search history.

(56) References Cited

U.S. PATENT DOCUMENTS 7,951,477 B2   5/2011 Wood et al.
10,062,877 B2 * 8/2018 Lee ..................... H01M 2/1022
                   (Continued)

FOREIGN PATENT DOCUMENTS

CN    101517784 A    8/2009
CN    103210522 A    7/2013
               (Continued)

OTHER PUBLICATIONS

International Search Report, issued in PCT/KR2014/006918, dated Nov. 7, 2014.

*Primary Examiner* — Jeremiah R Smith
(74) *Attorney, Agent, or Firm* — Birch, Stewart, Kolasch & Birch LLP (57) ABSTRACT

Disclosed herein is a battery module assembly including unit modules, each unit module comprising unit cells loaded in a cartridge the unit cells being electrically connected to each other via a bus bar, the battery module assembly including two or more sub modules arranged in a lateral direction to each other, each sub module having an external input terminal and an external output terminal, a base plate on which the sub modules are loaded, side cover plates mounted at sides of the sub modules, an upper cover plate loaded on tops of the sub modules, the upper cover plate being fastened and coupled to the sub modules and the side cover plates, a front cover plate mounted at a front of the battery module assembly at which the external input and output terminals of the sub modules are located, the front cover plate being fastened and coupled to the sub modules, the base plate, and the side cover plates, a main bus bar for fixing front ends of the sub modules to each other and connecting the external input and output terminals of the sub modules, and a bracket for fixing rear ends of the sub modules to each other.

29 Claims, 11 Drawing Sheets

(51) Int. Cl.
*H01M 10/647* (2014.01)
*H01M 10/6557* (2014.01)
*H01M 10/613* (2014.01)
*H01M 10/0525* (2010.01)
*H01M 2/02* (2006.01)

(52) U.S. Cl.
CPC ......... *H01M 2/1077* (2013.01); *H01M 2/202* (2013.01); *H01M 2/204* (2013.01); *H01M 2/206* (2013.01); *H01M 10/0525* (2013.01); *H01M 10/613* (2015.04); *H01M 10/647* (2015.04); *H01M 10/6557* (2015.04); *H01M 2/0245* (2013.01); *H01M 2220/10* (2013.01); *H01M 2220/20* (2013.01); *H01M 2220/30* (2013.01)

(56) References Cited

U.S. PATENT DOCUMENTS

| | | | |
|---|---|---|---|
| 2009/0208828 A1* | 8/2009 | Kanai | H01G 9/12 429/120 |
| 2010/0136420 A1 | 6/2010 | Shin et al. | |
| 2011/0104555 A1 | 5/2011 | Han et al. | |
| 2011/0297467 A1 | 12/2011 | Iwasa et al. | |
| 2012/0003520 A1* | 1/2012 | Lee | H01M 2/1022 429/83 |
| 2012/0100400 A1 | 4/2012 | Kang et al. | |
| 2012/0313559 A1* | 12/2012 | Tonomura | H01M 2/1077 318/139 |
| 2013/0059182 A1* | 3/2013 | Komatsu | H01M 2/1072 429/93 |
| 2013/0122339 A1 | 5/2013 | Chae et al. | |
| 2013/0136974 A1 | 5/2013 | Lim et al. | |
| 2013/0236761 A1 | 9/2013 | Seong et al. | |
| 2014/0017538 A1 | 1/2014 | Nakamori et al. | |
| 2014/0141300 A1 | 5/2014 | Ronning et al. | |

FOREIGN PATENT DOCUMENTS

| | | | |
|---|---|---|---|
| JP | 2006-344572 A | 12/2006 | |
| JP | 2008-166270 A | 7/2008 | |
| JP | 2008-243526 A | 10/2008 | |
| JP | 2010-504622 A | 2/2010 | |
| JP | 2011-23180 A | 2/2011 | |
| JP | 2011-165628 A | 8/2011 | |
| JP | 2012-182082 A | 9/2012 | |
| JP | 2012-529725 A | 11/2012 | |
| JP | 2013-115038 A | 6/2013 | |
| KR | 10-20053-0027506 A | 3/2008 | |
| KR | 10-2011-0060480 A | 6/2011 | |
| KR | 10-2012-0055158 A | 5/2012 | |
| WO | WO 2011065675 * | 6/2011 | H01M 2/10 |
| WO | WO 2012/151190 A2 | 11/2012 | |

\* cited by examiner

BATTERY MODULE ASSEMBLY

CROSS-REFERENCE TO RELATED APPLICATIONS

This application is a Continuation of U.S. application Ser. No. 14/779,514, filed on Sep. 23, 2015, which is the National Phase of PCT International Application No. PCT/KR2014/006918, filed on Jul. 29, 2014, which claims priority under 35 U.S.C. § 119(a) to Patent Application No. 10-2013-0090849, filed in the Republic of Korea on Jul. 31, 2013, all of which are hereby expressly incorporated by reference into the present application.

TECHNICAL FIELD

The present invention relates to a battery module assembly and, more particularly, to a battery module assembly including unit modules, each unit module comprising unit cells loaded in a cartridge the unit cells being electrically connected to each other via a bus bar, the battery module assembly including two or more sub modules arranged in a lateral direction to each other, each of the sub modules including two or more unit modules stacked in a vertical direction, each sub module having an external input terminal and an external output terminal, a base plate on which the sub modules are loaded, side cover plates mounted at sides of the sub modules, an upper cover plate loaded on tops of the sub modules, the upper cover plate being fastened and coupled to the sub modules and the side cover plates, a front cover plate mounted at a front of the battery module assembly at which the external input and output terminals of the sub modules are located, the front cover plate being fastened and coupled to the sub modules, the base plate, and the side cover plates, a main bus bar for fixing front ends of the sub modules to each other and connecting the external input and output terminals of the sub modules, and a bracket for fixing rear ends of the sub modules to each other.

BACKGROUND OF THE INVENTION

Secondary batteries have attracted considerable attention as an energy source for electric vehicles and hybrid electric vehicles, which have been developed to solve problems, such as air pollution, caused by existing gasoline and diesel vehicles using fossil fuel. In addition, the secondary batteries have started to be used as a main component of a power storage device. Therefore, the secondary batteries are being applied to an increasing number of applications owing to advantages thereof and, in the future, the secondary batteries are expected to be applied to even more applications and products.

As applications and products, to which the secondary batteries are applicable, are increased, kinds of batteries are also increased such that the batteries can provide outputs and capacities corresponding to the various applications and products. In addition, there is a strong need to reduce the size and weight of the batteries applied to the corresponding applications and products.

For example, small-sized mobile devices, such as a mobile phone, a personal digital assistant (PDA), a digital camera, and a laptop computer, use one or several small-sized, lightweight battery cells for each device according to the reduction in size and weight of the corresponding products. On the other hand, middle or large-sized devices, such as an electric vehicle, a hybrid electric vehicle, and a power storage device, use a middle or large-sized battery module or battery pack having a plurality of battery cells electrically connected with each other because high output and large capacity are necessary for the middle or large-sized devices. The size and weight of a battery module is directly related to an accommodation space and output of a corresponding middle or large-sized device. For this reason, manufacturers are trying to manufacture small-sized, lightweight battery modules.

Meanwhile, a conventional middle or large-sized battery module is manufactured by stacking a plurality of unit bodies, adding fixing plates to the top and the bottom of the stack of the unit bodies to fix the unit bodies, and fixing the stack of the unit bodies in a frame. In this case, however, overall volume of the battery module is increased. In addition, in a case in which an individual plate is provided to fix each of the unit bodies, overall rigidity of the battery module is reduced. For this reason, it is necessary to provide an additional reinforcing member. Furthermore, in a case in which an additional cooling channel or a cooling member is further loaded for cooling the battery module, the number of parts constituting the battery module is increased and it is difficult to efficiently perform works in a limited space.

Therefore, there is a high necessity for technology that is capable of fundamentally solving the above problems.

Technical Problem

The present invention has been made to solve the above problems and other technical problems that have yet to be resolved.

As a result of a variety of extensive and intensive studies and experiments to solve the problems as described above, the inventors of the present application have developed a battery module assembly configured to have a structure in which sub modules are fixed by side cover plates, a main bus bar, and a bracket each having a specific structure, whereby rigidity of the battery module assembly is increased while the increase in volume of the battery module assembly is restrained and, in addition, a uniform cooling effect of the battery module assembly is achieved.

Therefore, it is an object of the present invention to provide a battery module assembly which can be assembled to have a compact structure and does not need additional parts for improving stability and cooling efficiency of battery modules, whereby stability of battery module assembly is improved while the structure of the battery module assembly is compact and, in addition, production efficiency of the battery module assembly is improved.

Technical Solution

In accordance with one aspect of the present invention, the above and other objects can be accomplished by the provision of a battery module assembly including unit modules, each unit module comprising unit cells loaded in a cartridge the unit cells being electrically connected to each other via a bus bar, the battery module assembly including two or more sub modules arranged in a lateral direction to each other, each of the sub modules including two or more unit modules stacked in a vertical direction, each sub module having an external input terminal and an external output terminal, a base plate on which the sub modules are loaded, side cover plates mounted at sides of the sub modules, an upper cover plate loaded on tops of the sub modules, the upper cover plate being fastened and coupled to the sub modules and the side cover plates, a front cover plate mounted at a front of the battery module assembly at which the external input and output terminals of the sub modules are located, the front cover plate being fastened and coupled to the sub modules, the base plate, and the side cover plates, a main bus bar for fixing front ends of the sub modules to each other and connecting the external input and output terminals of the sub modules, and a bracket for fixing rear ends of the sub modules to each other.

As described above, the battery module assembly according to the present invention is configured to have a structure in which the sub modules are fixed by the side cover plates, the main bus bar, and the bracket each having a specific structure, whereby rigidity of the battery module assembly is increased while the increase in volume of the battery module assembly is restrained and, in addition, a uniform cooling effect of the battery module assembly is achieved.

In addition, the battery module assembly according to the present invention does not need additional parts for improving stability and cooling efficiency of battery modules during the manufacture of the battery module assembly, whereby the battery module assembly has a compact structure and, in addition, production efficiency of the battery module assembly is improved.

In a concrete example, each of the unit cells may be a plate-shaped battery cell or a structure in which two or more plate-shaped battery cells mounted in a cell cover in a state in which electrode terminals of the battery cells are exposed. In a concrete example, the cell cover may include a pair of sheathing members coupled to each other for covering outer surfaces of the battery cells excluding the electrode terminals of the battery cells.

In addition, the battery cell may be a prismatic secondary battery or a pouch-shaped secondary battery.

The prismatic secondary battery may be configured to have a structure in which an electrode assembly is mounted in a prismatic metal case in a sealed state and the pouch-shaped secondary battery may be configured to have a structure in which an electrode assembly is mounted in a laminate sheet including a resin layer and a metal layer in a sealed state.

Specifically, the secondary battery may be a lithium secondary battery exhibiting high energy density, discharge voltage, and output stability. Other components of the lithium secondary battery will hereinafter be described in detail.

In general, the lithium secondary battery includes a cathode, an anode, a separator, and a non-aqueous electrolytic solution containing lithium salt.

The cathode may be manufactured, for example, by applying a mixture of a cathode active material, a conductive material, and a binder to a cathode current collector and drying the applied mixture. A filler may be further added as needed. On the other hand, the anode may be manufactured by applying a mixture of an anode active material and a binder to an anode current collector and drying the applied mixture. The above-mentioned ingredients may be further included as needed.

The separator is disposed between the anode and the cathode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains and, therefore, a detailed description thereof will be omitted.

The lithium secondary battery may be manufactured using an ordinary method well known in the art to which the present invention pertains. That is, the lithium secondary battery may be manufactured by disposing a porous separator between a cathode and an anode and injecting an electrolytic solution thereinto.

The cathode may be manufactured, for example, by applying a slurry containing a lithium transition metal oxide active material, a conductive material, and a binder to a current collector and drying the applied slurry. In the same manner, the anode may be manufactured, for example, by applying a slurry containing a carbon active material, a conductive material, and a binder to a thin current collector and drying the applied slurry.

In a battery cell assembly, which may be an example of each of the unit cells, the cell cover may include a pair of sheathing members coupled to each other for covering outer surfaces of the battery cells excluding the electrode terminals of the battery cells. For example, two battery cells may be mounted in the cell cover. The two battery cells may be stacked such that the same-polarity electrode terminals of the battery cells are connected in parallel to each other while abutting on each other to constitute a battery cell assembly.

In a concrete example, the unit cells in each of the unit modules may be connected in parallel to each other.

Specifically, the unit cells may be mounted on the cartridge such that electrode terminals of the unit cells face each other and the electrode terminals of the unit cells may be connected in parallel to each other by bus bars for connection between battery cells mounted at the cartridge.

The cartridge is an electrically insulative member exhibiting predetermined rigidity. The cartridge protects the unit cells from external impact and secures stable mounting of the unit cells. In addition, the unit cells are arranged such that the electrode terminals of the unit cells face each other by the cartridge. Consequently, it is possible to more easily achieve electrical parallel connection between the unit cells via bus bars.

A fixing member may be mounted between electrode terminal connection parts of the unit cells for fixing the electrode terminal connection parts to the cartridge in position. In a concrete example, the fixing member may include an electrically insulative protruding part having an outer shape corresponding to a shape between the electrode terminal connection parts, the protruding part having a through hole formed at a middle region thereof, the protruding part being mounted on the cartridge, and a fastening part inserted through the through hole for coupling the protruding part to the cartridge.

Even when external impact is applied, therefore, the unit cells can be stably mounted and fixed to the cartridge.

In addition, each of the cartridges may be provided at opposite sides thereof with protruding parts having fastening holes and the cartridges may be coupled to each other by fastening members inserted through the fastening holes to constitute each of the sub modules. Consequently, the unit cells are fixed by each of the cartridges and, at the same time, the cartridges are fastened and coupled to each other through the fastening holes, thereby achieving a more secure and stable fixing effect. The fastening between the cartridges through the fastening holes may be achieved using, for example, bolts or rivets inserted through the fastening holes. However, the present invention is not limited thereto.

In a concrete example, one side end of a region of the bus bar for connection between the unit modules to which the electrode terminals are coupled may be bent upward or downward and the bent one side end may be coupled to a connection member for achieving electrical connection with an adjacent one of the unit modules.

In addition, the unit modules in each of the sub modules are connected in series or in parallel to each other. For example, the connection members may be mounted at the same positions and the stacked structure of the unit modules may be changed to achieve parallel connection.

In a concrete example, each of the side cover plates may be provided with one or more coolant introduction holes for allowing a coolant to be introduced therethrough.

In addition, the unit modules in each of the sub modules may be stacked such that a first coolant flow channel is formed at a stacked interface between the unit modules and the sub modules may be arranged such that the sub modules are spaced apart from each other to provide a second coolant flow channel.

In a concrete example, each of the side cover plates, which may be a member mounted at a side of a corresponding one of the sub modules such that the sub modules can be mounted and fixed to the base plate and the upper cover plate, may include a body part for covering a side of a corresponding one of the sub modules, bent parts formed at opposite ends of the body part, the bent parts being bent and extend such that the bent parts cover a corresponding one of the sub modules, the bent parts being fastened and fixed to a corresponding one of the sub modules, and a handle formed at one side end of the body part. The body part may be provided with coolant introduction holes.

In addition, the main bus bar, which may be a member for connecting the external input and output terminals formed at the sub modules to each other and, at the same time, fixing the sub modules to each other such that a predetermined space is maintained between the sub modules, may include a plate-shaped body part, fixing parts, and an opening formed through a middle region of the body part. The fixing parts may be provided with fastening holes, through which the fixing parts are fastened and fixed to the external input and output terminals of the sub modules.

The bracket may be provided with a coolant discharge hole communicating with the coolant flow channel. A fan or a discharge duct may be mounted in the coolant discharge hole.

In a concrete example, the bracket, which may be a member for fixing the sub modules to each other such that a predetermined space is maintained between the sub modules in the same manner as in the main bus bar, may include a plate-shaped body part, fixing parts, and a coolant discharge hole formed through a middle region of the body part. The body part may be provided at each end thereof with concavo-convex part having a shape corresponding to a rear concavo-convex structure of each of the sub modules and the fixing parts may be provided with fastening holes, through which the fixing parts are fastened and fixed to rears of the sub modules.

In the battery module assembly as described above, the coolant flow channel is formed at the stacked interface between the unit modules, the coolant introduction hole, through which a coolant is supplied to the coolant flow channel, is formed at each of the side cover plates, and the coolant discharge hole, through which the coolant is discharged after the coolant cools the unit modules, is formed at the bracket located at the rears of the respective sub modules, whereby it is possible to uniformly cool the unit modules constituting the battery module assembly. Consequently, it is possible to achieve an overall cooling effect of the battery module assembly through improved efficiency.

For example, the upper cover plate and the base plate each may be made of a sheet exhibiting predetermined rigidity and elasticity. In this case, each of the sub modules may be integrated into a single body and may be protected from external impact.

The upper cover plate and the base plate are not particularly restricted so long as the upper cover plate and the base plate can be manufactured by machining. In a concrete example, the upper cover plate and the base plate may be manufactured by press forming.

In addition, the upper cover plate and the base plate each may be provided at the outer surface thereof with reinforcing beads configured to have a concavo-convex structure for improving rigidity of the upper cover plate and the base plate.

According to circumstances, the upper cover plate and the base plate may be further provided with fastening holes, through which the upper cover plate and the base plate are fastened and coupled to the sub modules.

Consequently, the sub modules are fastened and fixed to the upper cover plate and the base plate and, therefore, it is possible to achieve a more secure and stable fixing effect. In addition, the fastening of the sub modules to the upper cover plate and the base plate through the fastening holes may be achieved using, for example, bolts or rivets. However, the present invention is not limited thereto.

In accordance with another aspect of the present invention, there is provided a device including the battery module assembly with the above-stated construction as a power source. Specifically, the device may be an electric vehicle, a hybrid electric vehicle, a plug-in hybrid electric vehicle, a power storage device, a power supply for emergency, a power supply for computer rooms, a portable power supply, a power supply for medical facilities, a power supply for fire extinguishing facilities, a power supply for alarm facilities, or a power supply for refuge facilities. However, the present invention is not limited thereto.

The structure and manufacturing method of the device are well known in the art to which the present invention pertains and, therefore, a detailed description thereof will be omitted.

Effects of the Invention

As is apparent from the above description, the battery module assembly according to the present invention is configured to have a structure in which the sub modules are fixed by the side cover plates, the main bus bar, and the bracket each having a specific structure, whereby rigidity of the battery module assembly is increased while the increase in volume of the battery module assembly is restrained and, in addition, a uniform cooling effect of the battery module assembly is achieved. In addition, the battery module assembly according to the present invention can be assembled to have a compact structure does not need additional parts for improving stability and cooling efficiency of battery modules, whereby the battery module assembly has a compact structure and, in addition, production efficiency of the battery module assembly is improved.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
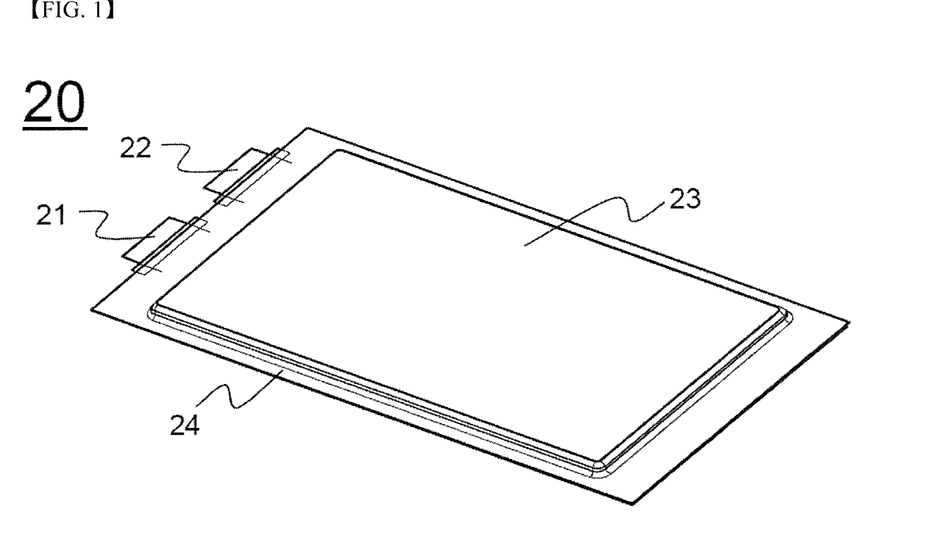
FIG. 1 is a perspective view showing a pouch-shaped battery cell according to the present invention.

FIG. 1 is a perspective view showing a pouch-shaped battery cell according to the present invention.

Referring to FIG. 1, a battery cell 20 is a plate-shaped battery cell 20 having electrode terminals (a cathode terminal 21 and an anode terminal 22) formed at one side end thereof. Specifically, the plate-shaped battery cell 20 is configured to have a structure in which an electrode assembly (not shown) is mounted in a pouch-shaped battery case 23 made of a laminate sheet including a metal layer (not shown) and a resin layer (not shown) and a sealed part 24 is formed by, for example, thermal bonding. The plate-shaped battery cell 20 may be generally referred to as a 'pouch-shaped battery cell.'

Figure 2:
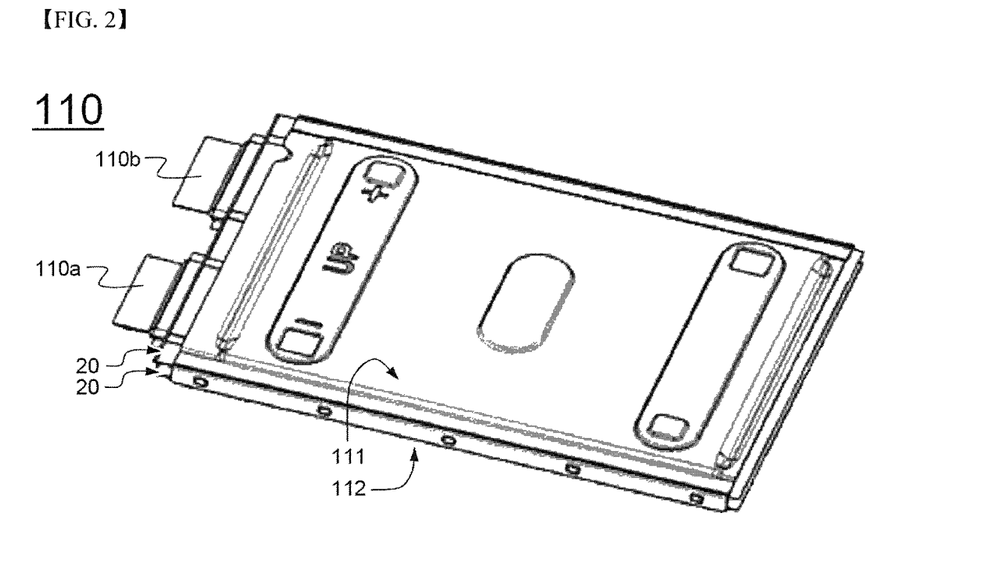
FIG. 2 is a perspective view showing a unit cell configured to have a structure in which battery cells, one of which is shown in FIG. 1, are mounted in cell covers.

FIG. 2 is a perspective view showing a unit cell configured to have a structure in which battery cells, one of which is shown in FIG. 1, are mounted in cell covers.

Referring to FIG. 2 together with FIG. 1, two battery cells 20 are received and fixed in cell covers 111 and 112 including an upper cell cover 111 and a lower cell cover 112. In addition, electrode terminals 21 and 22 of the two battery cells 20 are exposed from one side ends of the cell covers such that the electrode terminals 21 and 22 of the two battery cells 20 are electrically connected in parallel to each other to form two electrode terminals 110a and 110b.

Figure 3:
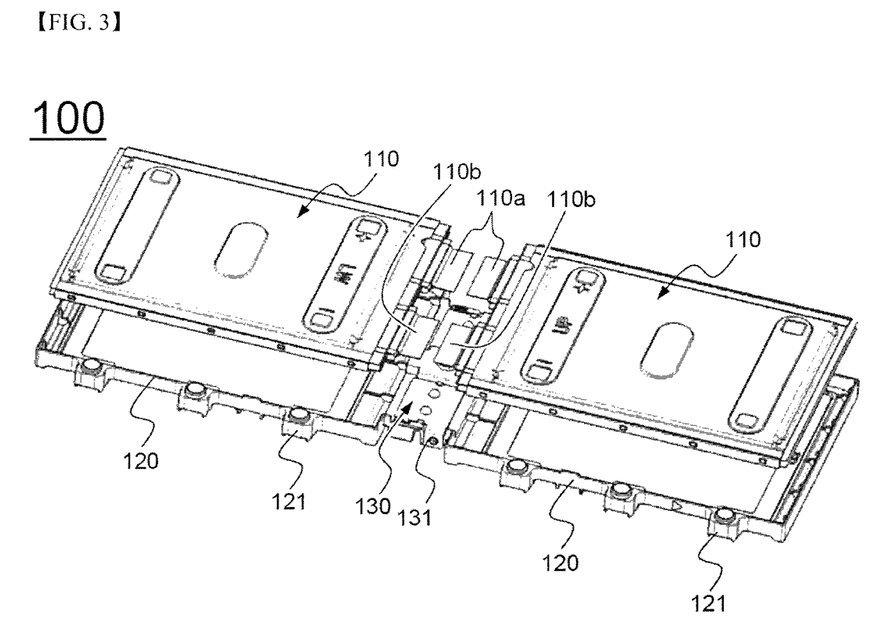
FIG. 3 is a perspective view showing a unit module configured to have a structure in which unit cells, one of which is shown in FIG. 2, are mounted in a cartridge.
Figure 4:
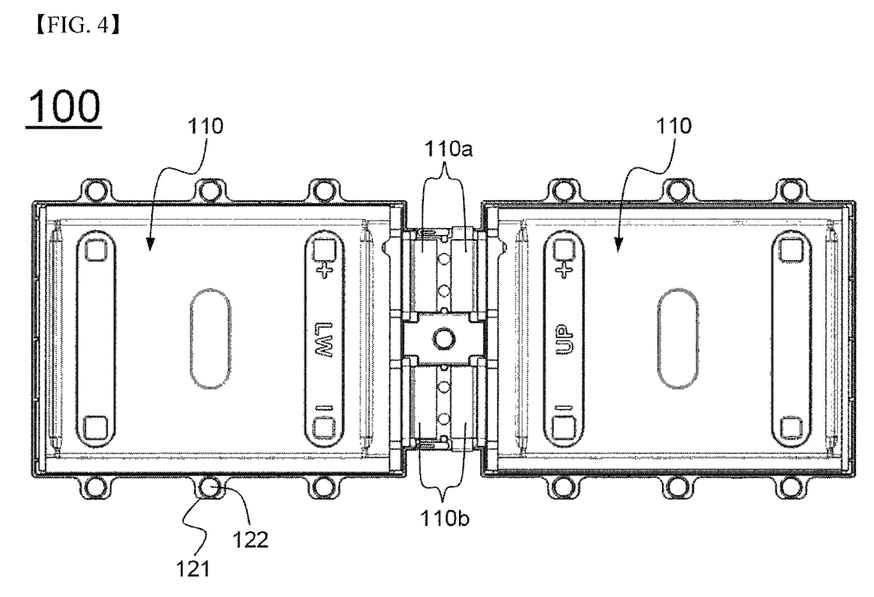
FIG. 4 is a plan view showing a unit module according to the present invention.
Figure 5:
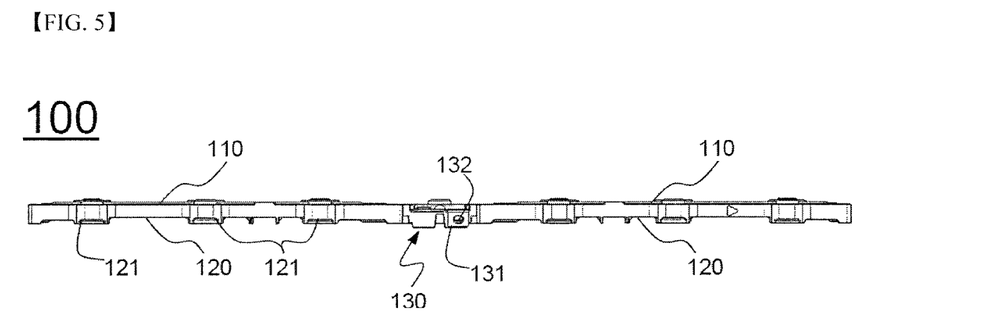
FIG. 5 is a side view showing the unit module according to the present invention.

FIG. 3 is a perspective view showing a unit module configured to have a structure in which unit cells, one of which is shown in FIG. 2, are mounted in a cartridge. FIGS. 4 and 5 are a plan view and a side view showing a unit module according to the present invention, respectively.

Referring to these drawings, two unit cells 110 are mounted in a cartridge 120 to constitute one unit module 100. At this time, the two unit cells 110 are arranged such that the cathode terminal 110a and the anode terminals 110b of one of the unit cells 110 face the cathode terminal 110a and the anode terminal 110b of the other unit cell 100, respectively. In addition, the cathode terminals 110a of the unit cells are electrically connected in parallel to each other via a bus bar 130 and the anode terminals 110b of the unit cells are electrically connected in parallel to each other via another bus bar 130.

Specifically, the bus bars 130 are electrically coupled to the electrode terminals 110a and 110b. Each of the bus bars 130 is provided at one side end thereof with a bent part 131, which is bent downward. The bent part 131 has a fastening hole 132. The fastening hole 132 is used for electrical connection between unit modules 100 when the unit modules 100 are stacked (see FIGS. 6 and 7).

In addition, the cartridge 120 is provided at opposite sides thereof with protruding parts 121, each of which has a fastening hole 122. The unit modules 100 may be coupled to each other by fastening members 123 (see FIG. 5) inserted through the fastening holes 122 of the protruding parts 121.

Each of the protruding parts 121 has a height 110 to 150% greater than the height of the cartridge 120. When the unit modules 100 are stacked, therefore, a predetermined gap 170 (see FIG. 9) is formed at a stacked interface between the unit modules 100. The gap 170 (see FIG. 9) may be used as a coolant flow channel, along which a coolant flows.

Figure 6:
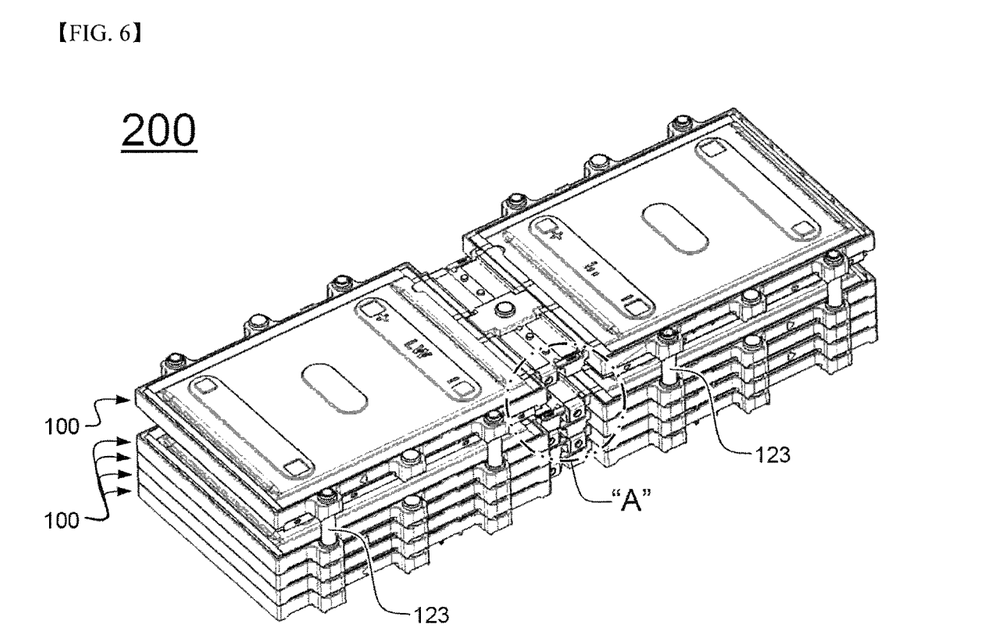
FIG. 6 is a perspective view showing a shape in which unit modules according to the present invention are stacked.

FIG. 6 is a perspective view showing a shape in which unit modules according to the present invention are stacked.

Referring to FIG. 6, unit modules 100 are vertically stacked from the ground to constitute one sub module 200. Specifically, the unit modules 100 are vertically stacked and then fastening members 123 are inserted through the protruding parts formed at opposite sides of the unit modules 100 such that the unit modules 100 are coupled to each other.

Figure 7:
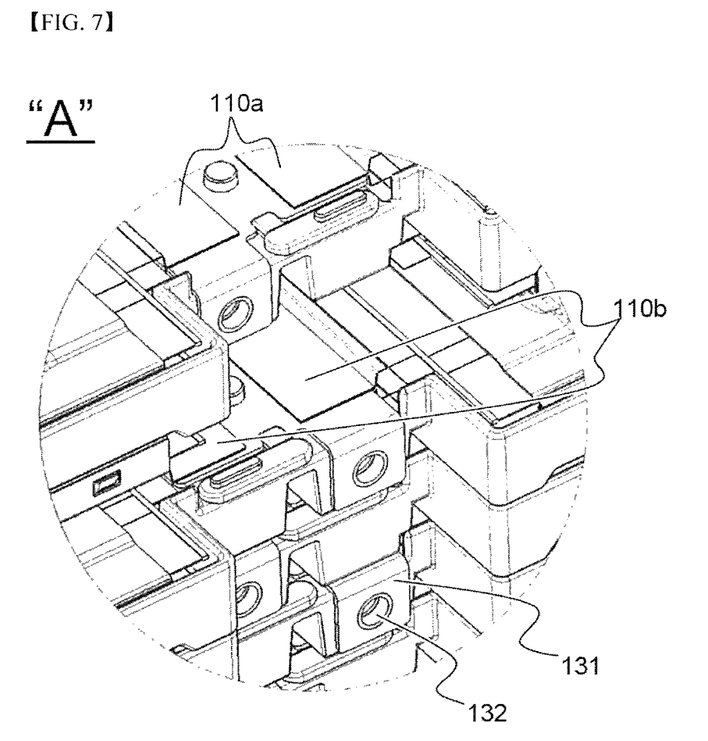
FIG. 7 is a partially enlarged view of FIG. 6.
Figure 8:
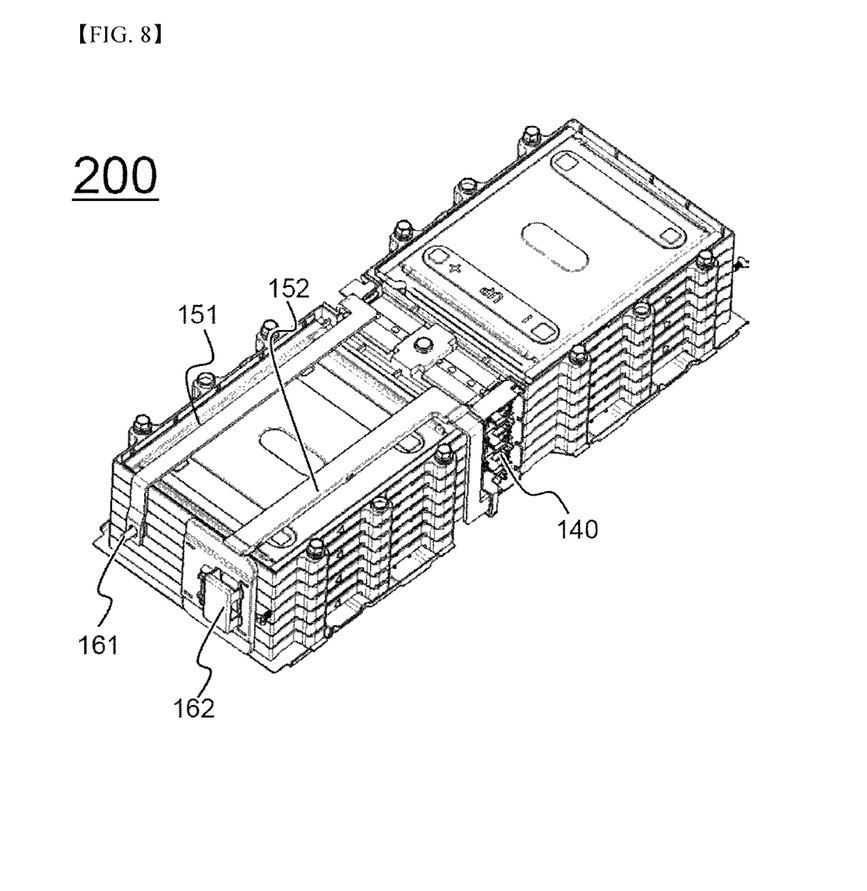
FIG. 8 is a perspective view showing a shape in which series connection parts and bus bars for external input and output terminals are mounted at a sub module according to the present invention.

FIG. 7 is a partially enlarged view of FIG. 6 and FIG. 8 is a perspective view showing a shape in which connection parts 140 and bus bars 151 and 152 for external input and output terminals are mounted at a sub module 200 according to the present invention.

Referring to these drawings, the unit modules 100 are electrically connected in series to each other via the connection parts 140. In addition, the bus bars 151 and 152 for external input and output terminals are mounted at the series-connected unit modules 100 such that the unit modules 100 can be electrically connected to external input and output terminals 161 and 162 via the bus bars 151 and 152 for external input and output terminals.

Figure 9:
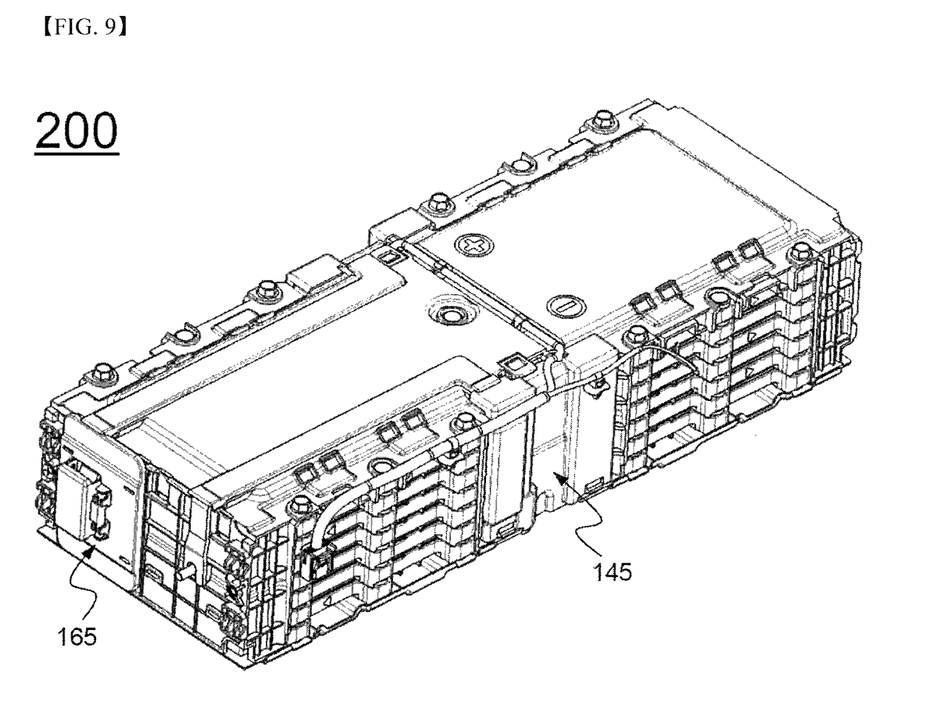
FIG. 9 is a perspective view showing a shape in which an external input and output terminal protection member and a series connection member protection member are mounted at the sub module of FIG. 8.

FIG. 9 is a perspective view showing a shape in which an external input and output terminal protection member and a series connection member protection member are mounted at the sub module of FIG. 8.

Referring to FIG. 9 together with FIG. 8, an external input and output terminal protection member 165 is mounted at the external input and output terminal 161 of the sub module 200 for protecting the external input and output terminal 161 from the outside. In addition, a series connection member protection member 145 is mounted at the series connection parts 140, via which the unit modules 100 are electrically connected in series to each other, for protecting the series connection parts 140.

Figure 10:
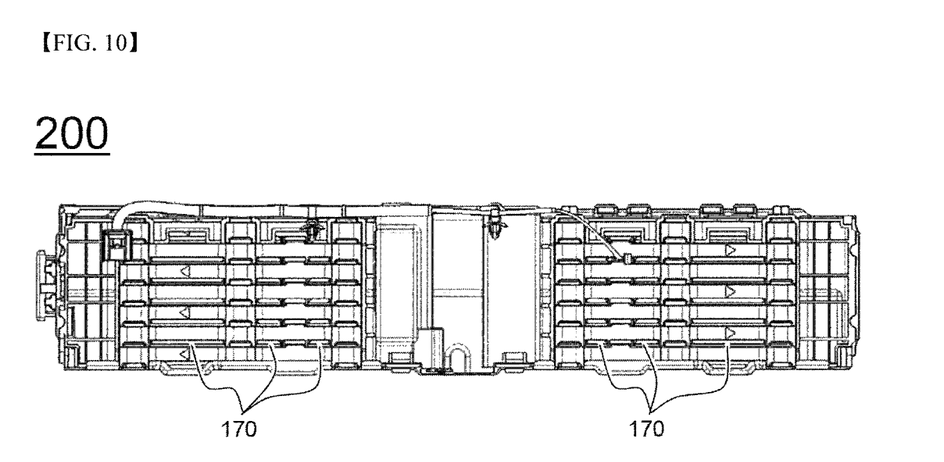
FIG. 10 is a side view of FIG. 9.

FIG. 10 is a side view of FIG. 9.

Referring to FIG. 10 together with FIG. 5, predetermined gaps 170 may be formed at stacked interfaces between the respective unit modules 100 constituting the sub module 200. The gaps 170 may be used as coolant flow channels, along which a coolant flows.

Figure 11:
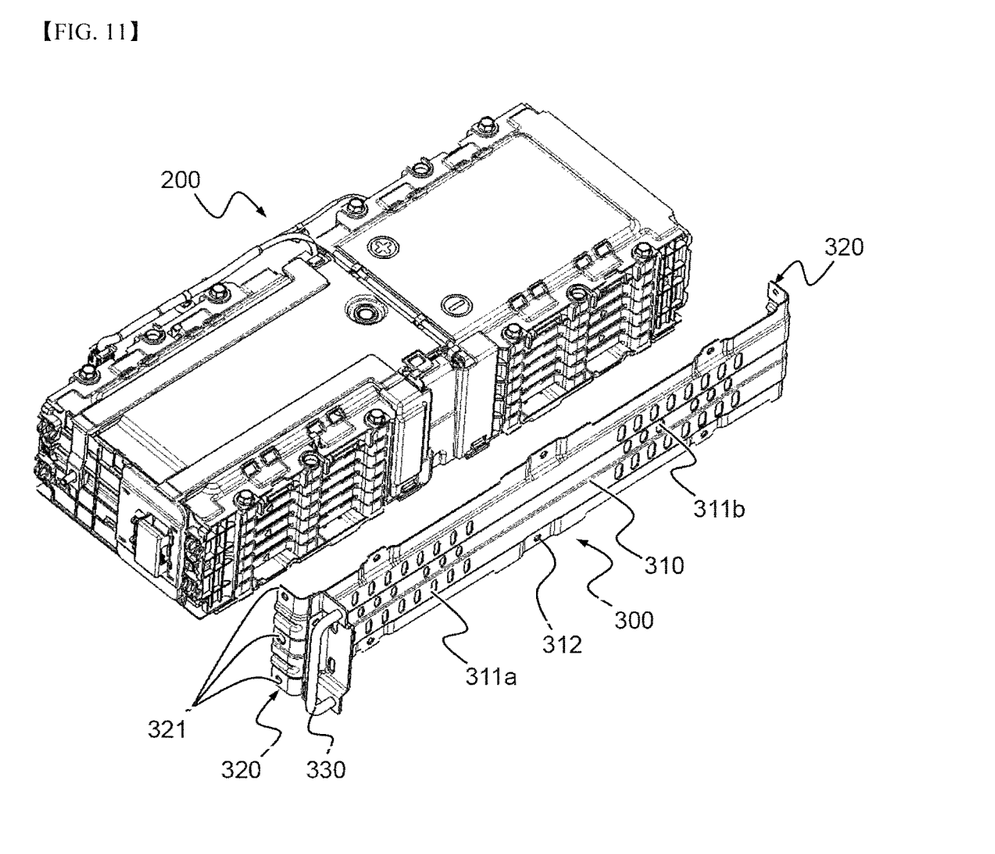
FIG. 11 is a perspective view showing a shape in which a side cover plate is mounted at the sub module of FIG. 9.

FIG. 11 is a perspective view showing a shape in which a side cover plate is mounted at the sub module of FIG. 9.

Referring to FIG. 11, a side cover plate 300 includes a body part 310 for covering one side of the sub module 200. The body part 310 is provided with coolant introduction holes 311, through which a coolant is introduced into the sub module 200 from the outside. In addition, the body part 310 is provided at opposite ends thereof with bent parts 320, which are bent and extend such that the bent parts 320 cover the sub module 200.

In addition, fixing parts 312 and 321, which are fastened and fixed to the sub module 200, are formed at the body part 310 and the bent parts 320 of the side cover plate 300. A handle 330 is formed at one side end of the body part 310.

Figure 12:
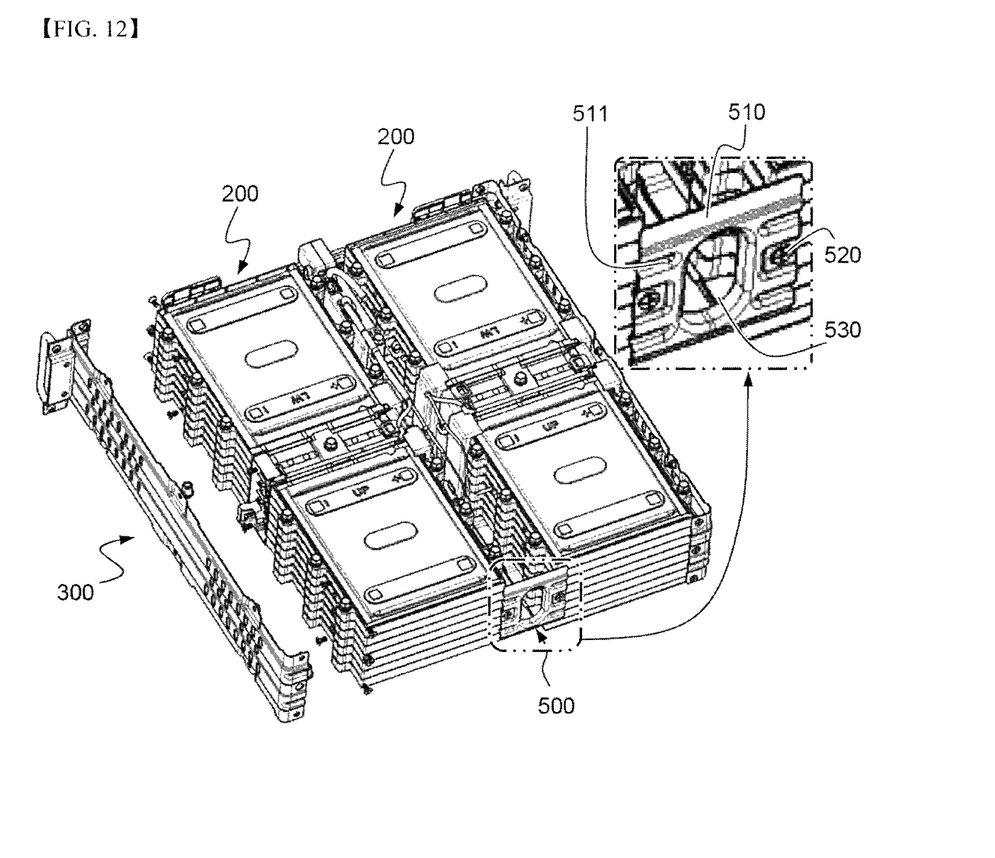
FIG. 12 is a perspective view showing a shape in which two sub modules according to the present invention are fixed by side cover plates and a bracket.

FIG. 12 is a perspective view showing a shape in which two sub modules are fixed by side cover plates and a bracket.

Referring to FIG. 12, two sub modules 200 are coupled to each other by a bracket 500 mounted at rears of the sub modules.

Specifically, the bracket 500 includes a plate-shaped body part 510, fixing parts 520, and a coolant discharge hole 530 formed through a middle region of the body part 510.

In addition, the body part 510 is provided at each end thereof with concavo-convex part 511 having a shape corresponding to a rear concavo-convex structure of each of the sub modules 200. The fixing parts 520 are provided with fastening holes, through which the fixing parts may be fastened and fixed to the rears of the sub modules 200.

Figure 13:
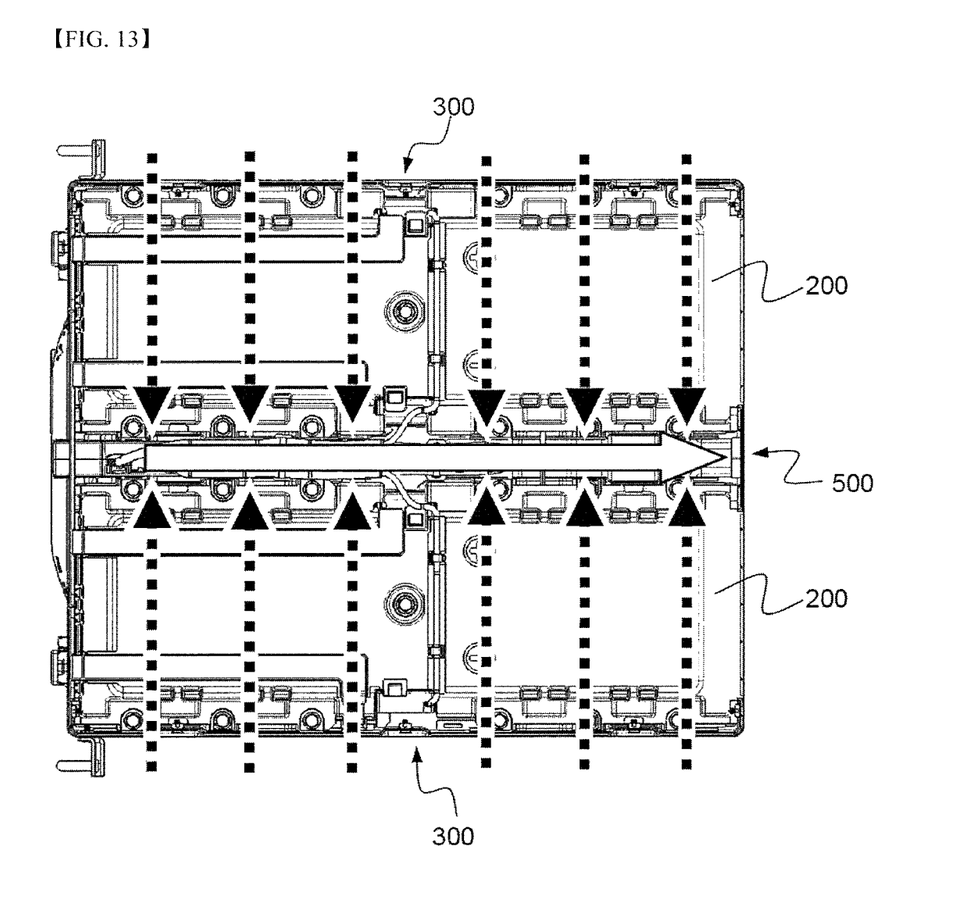
FIG. 13 is a plan view of FIG. 12.

FIG. 13 is a plan view of FIG. 12.

Referring to FIG. 13, coolant flow channels (see arrows), along which a coolant flows, are formed in a middle part of each of the sub modules 200 by the bracket 500 mounted at the rears of the sub modules 200 and a main bus bar 400 (see FIG. 14) mounted at the fronts of the sub modules 200. Consequently, the coolant may be introduced into the sub modules 200 through the side cover plates 300 to cool battery cells (not shown) mounted in the sub modules 200, flow along the middle coolant flow channels, and then discharged out of the sub modules 200 through the coolant discharge hole 530 formed at the bracket 500.

According to circumstances, a fan (not shown) or a discharge duct (not shown) may be mounted in the coolant discharge hole 530 to further improve cooling efficiency.

Figure 14:
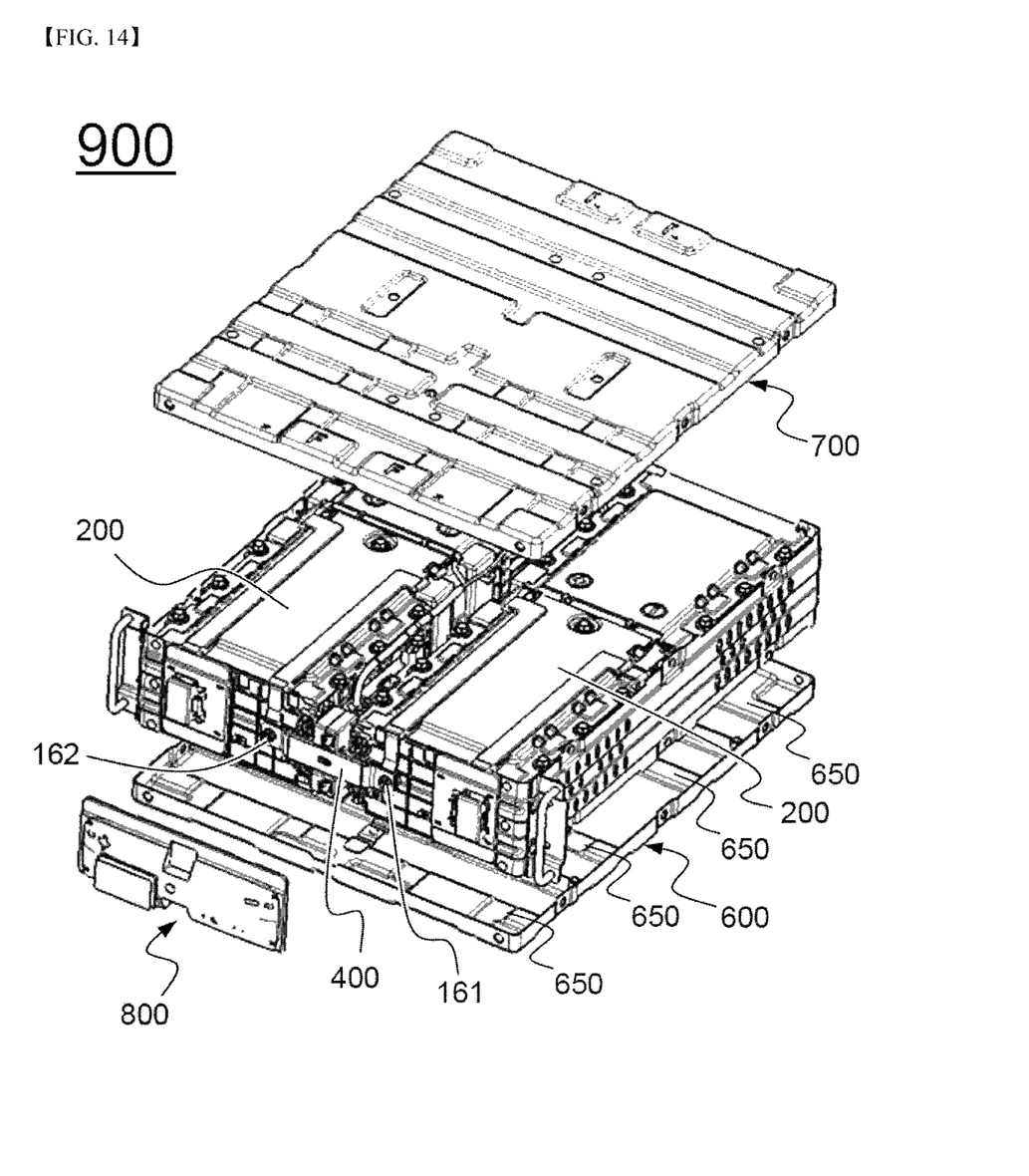
FIG. 14 is a perspective view showing a shape in which the two sub modules according to the present invention are fixed by a main bus bar in a state in which the two sub modules are electrically connected to each other by the main bus bar and a base plate, an upper cover plate, and a front cover plate are mounted at the sub modules.

FIG. 14 is a perspective view showing a shape in which the two sub modules are fixed by a main bus bar in a state in which the two sub modules are electrically connected to each other by the main bus bar and a base plate, an upper cover plate, and a front cover plate are mounted at the sub modules.

Referring to FIG. 14, the external input and output terminals 162 and 161 of the two sub modules 200 are electrically connected in series to each other via a main bus bar 400. In addition, the two sub modules 200 are fixed by the main bus bar 400 such that the two sub modules 200 are spaced apart from each other by a predetermined distance.

In addition, in a state in which the two sub modules 200 are loaded on a base plate 600, the tops of the two sub modules 200 are protected by an upper cover plate 700 and the fronts of the two sub modules 200 are protected by a front cover plate 800.

Figure 15:
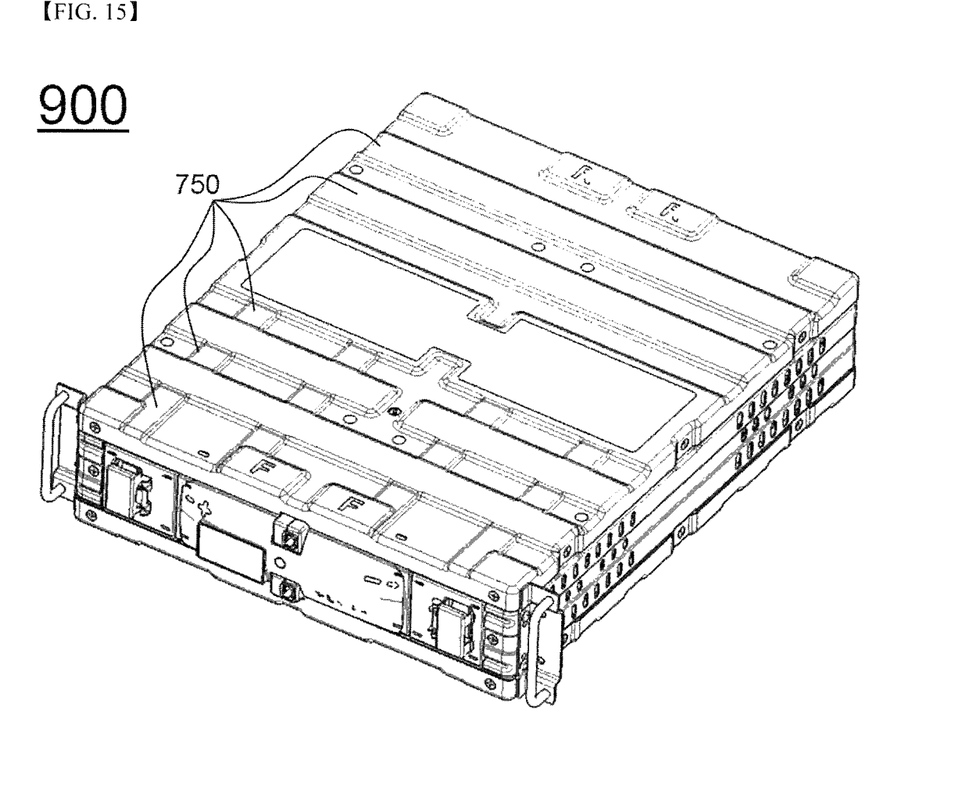
FIG. 15 is a perspective view showing a battery module assembly according to the present invention.

FIG. 15 is a perspective view showing a battery module assembly according to the present invention.

Referring to FIG. 15 together with FIG. 14, reinforcing beads 750 and 650 configured to have a concavo-convex structure for improving rigidity of the upper cover plate 700 and the base plate 600 are formed at the outer surfaces of the upper cover plate 700 and the base plate 600.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery module assembly comprising:
two or more sub modules arranged in a lateral direction to each other, each sub module having an external input terminal and an external output terminal, each submodule having a plurality of unit modules, each unit module comprising unit cells loaded in a cartridge, the unit cells being electrically connected to each other via a bus bar;
a base plate on which the sub modules are loaded;
side cover plates mounted at sides of the sub modules;
an upper cover plate loaded on tops of the sub modules, the upper cover plate being fastened and coupled to the sub modules and the side cover plates;
a front cover plate mounted at a front of the battery module assembly at which the external input and output terminals of the sub modules are located, the front cover plate being fastened and coupled to the sub modules, the base plate, and the side cover plates;
a main bus bar for fixing front ends of the sub modules to each other and connecting the external input and output terminals of the sub modules; and
a bracket for fixing rear ends of the sub modules to each other,
wherein each of the side cover plates is provided with one or more coolant introduction holes for allowing a coolant to be introduced therethrough, and
wherein the bracket is provided with a coolant discharge hole communicating with a coolant flow channel.

2. The battery module assembly according to claim 1, wherein each of the unit cells is a plate-shaped battery cell or a battery cell assembly having two or more plate-shaped battery cells mounted in a cell cover in a state in which electrode terminals of the battery cells are exposed.

3. The battery module assembly according to claim 2, wherein the battery cell is a prismatic secondary battery or a pouch-shaped secondary battery.

4. The battery module assembly according to claim 3, wherein the pouch-shaped secondary battery is configured to have a structure in which an electrode assembly is mounted in a laminate sheet comprising a resin layer and a metal layer in a sealed state.

5. The battery module assembly according to claim 4, wherein plate-shaped battery cell is a lithium secondary battery.

6. The battery module assembly according to claim 2, wherein the cell cover comprises a pair of sheathing members coupled to each other for covering outer surfaces of the battery cells excluding the electrode terminals of the battery cells.

7. The battery module assembly according to claim 1, wherein the unit cells in each of the unit modules are connected in parallel to each other.

8. The battery module assembly according to claim 7, wherein the unit cells are mounted on the cartridge such that electrode terminals of the unit cells face each other, and the electrode terminals of the unit cells are connected in parallel to each other by bus bars mounted at the cartridge.

9. The battery module assembly according to claim 8, wherein a fixing member is mounted between electrode terminal connection parts of the unit cells for fixing the electrode terminal connection parts to the cartridge in position.

10. The battery module assembly according to claim 9, wherein the fixing member comprises an electrically insulative protruding part having an outer shape corresponding to a shape between the electrode terminal connection parts, the protruding part having a through hole formed at a middle region thereof, the protruding part being mounted on the cartridge, and a fastening part inserted through the through hole for coupling the protruding part to the cartridge.

11. The battery module assembly according to claim 1, wherein each of the cartridges is provided at opposite sides thereof with protruding parts having fastening holes, and the cartridges are coupled to each other by fastening members inserted through the fastening holes to constitute each of the sub modules.

12. The battery module assembly according to claim 1, wherein the unit modules in each of the sub modules are stacked such that a first coolant flow channel is formed at a stacked interface between the unit modules, and the sub modules are arranged such that the sub modules are spaced apart from each other to provide a second coolant flow channel.

13. The battery module assembly according to claim 1, wherein the unit modules in each of the sub modules are connected in series to each other.

14. The battery module assembly according to claim 1, wherein one side end of a region of the bus bar to which electrode terminals are coupled is bent upward or downward, and the bent one side end is coupled to a connection member for connection with an adjacent one of the unit modules.

15. The battery module assembly according to claim 1, wherein
the main bus bar comprises a plate-shaped body part, fixing parts, and an opening formed through a middle region of the body part, and
the fixing parts are provided with fastening holes, through which the fixing parts are fastened and fixed to the external input and output terminals of the sub modules.

16. The battery module assembly according to claim 1, wherein
the bracket comprises a plate-shaped body part, fixing parts, and the coolant discharge hole formed through a middle region of the body part,
the body part is provided at each end thereof with concavo-convex part having a shape corresponding to a rear concavo-convex structure of each of the sub modules, and
the fixing parts are provided with fastening holes, through which the fixing parts are fastened and fixed to rears of the sub modules.

17. The battery module assembly according to claim 1, wherein the upper cover plate and the base plate each are made of a metal sheet exhibiting elasticity.

18. The battery module assembly according to claim 17, wherein the upper cover plate and the base plate each are provided with reinforcing beads configured to have a concavo-convex structure.

19. A device comprising a battery module assembly according to claim 1 as a power source.

20. The device according to claim 19, wherein the device is an electric vehicle, a hybrid electric vehicle, a plug-in hybrid electric vehicle, a power storage device, a power supply for emergency, a power supply for computer rooms, a portable power supply, a power supply for medical facilities, a power supply for fire extinguishing facilities, a power supply for alarm facilities, or a power supply for refuge facilities.

21. A battery module assembly comprising:
a first sub module having a first plurality of vertically stacked unit modules, the sub module having a first pair of external terminals at a front surface;
a second sub module having a second plurality of vertically stacked unit modules, the sub module having a second pair of external terminals at a front surface, the second sub module spaced from the first sub module in a lateral direction to form a main coolant channel between the sub modules,
each unit module comprising an upper wall and a lower wall and at least one battery cell with the unit module;
a protrusion extending laterally from each unit module, the protrusions having a thickness greater than the thickness of the unit module, the protrusions of the unit modules connected to one another when the unit modules are stacked;
a coolant channel formed between the stacked unit modules;
a main bus bar connected to an external terminal of each of the sub modules; and
a bracket connected to a rear surface of the sub modules, the bracket extending laterally across the main coolant channel between the sub modules and having a coolant discharge hole in communication with the main coolant channel.

22. The battery module according to claim 21, wherein the main bus bar comprises a main body part and an opening formed through a central region of the body part.

23. The battery module assembly according to claim 22, wherein the bracket comprises a body part and the coolant discharge hole formed through a central region of the body part.

24. The battery module according to claim 21, wherein each unit module comprises a pair of unit cells, each unit cell having a pair of electrode terminals;
a first bus bar connected to an electrode terminal of each unit cell;
a tab extending from the first bar; and
a connector attached to the tabs of the stacked unit modules.

25. The battery module according to claim 21, further comprising:
a base plate on which the sub modules are loaded;
side cover plates mounted at sides of the sub modules;
an upper cover plate loaded on tops of the sub modules, the upper cover plate being fastened and coupled to the sub modules and the side cover plates; and
a front cover plate mounted at a front of the battery module assembly.

26. The battery module according to claim 21, further comprising:
a fastener extending through the protrusions of the stacked unit modules.

27. The battery module according to claim 21, further comprising side cover plates mounted at sides of the sub modules, the side cover plates having coolant openings,
wherein the rear surface of the sub modules are spaced from a front surface of the sub modules in a longitudinal direction.

28. The battery module according to claim 21, wherein each unit module of each sub module comprises a pair of unit cells in a cartridge facing each other, the pair of unit cells connected by a bus bar,
wherein the bus bar comprises tabs bent from edges of the bus bar and a fastening hole in the tabs.

29. A battery module assembly comprising:
two or more sub modules arranged in a lateral direction to each other, each sub module having an external input terminal and an external output terminal, each submodule having a plurality of unit modules, each unit module comprising unit cells loaded in a cartridge, the unit cells being electrically connected to each other via a bus bar;
a base plate on which the sub modules are loaded;
side cover plates mounted at sides of the sub modules;
an upper cover plate loaded on tops of the sub modules, the upper cover plate being fastened and coupled to the sub modules and the side cover plates;
a front cover plate mounted at a front of the battery module assembly at which the external input and output terminals of the sub modules are located, the front cover plate being fastened and coupled to the sub modules, the base plate, and the side cover plates;
a main bus bar for fixing front ends of the sub modules to each other and connecting the external input and output terminals of the sub modules; and
a bracket for fixing rear ends of the sub modules to each other
wherein each of the side cover plates comprises:
a body part for covering a side of a corresponding one of the sub modules;
bent parts formed at opposite ends of the body part, the bent parts being bent and extend such that the bent parts cover a corresponding one of the sub modules, the bent parts being fastened and fixed to a corresponding one of the sub modules; and
a handle formed at one side end of the body part, and
wherein the body part is provided with coolant introduction holes.

* * * * *